US008660210B2

(12) United States Patent
Kim

(10) Patent No.: US 8,660,210 B2
(45) Date of Patent: Feb. 25, 2014

(54) METHOD OF PACKET FORMAT DEPENDENT SELECTION OF MIMO-OFDM DEMODULATOR

(75) Inventor: Byoung-Hoon Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2009 days.

(21) Appl. No.: 11/625,815

(22) Filed: Jan. 22, 2007

(65) Prior Publication Data

US 2007/0195738 A1    Aug. 23, 2007

Related U.S. Application Data

(60) Provisional application No. 60/761,566, filed on Jan. 23, 2006.

(51) Int. Cl.
*H03K 9/00* (2006.01)
*H04L 27/00* (2006.01)

(52) U.S. Cl.
USPC ............................ 375/316; 375/269; 375/279

(58) Field of Classification Search
USPC .................. 375/341, 268, 269, 271, 279, 316
See application file for complete search history.

(56) References Cited

U.S. PATENT DOCUMENTS

| 7,593,492 B1 * | 9/2009 | Lande ........................... 375/346 |
| 2005/0286522 A1 | 12/2005 | Paddon et al. |
| 2006/0083319 A1 * | 4/2006 | Giannakis et al. ............ 375/259 |

FOREIGN PATENT DOCUMENTS

| EP | 1363405 | | 11/2003 |
| JP | 2004343702 | A | 12/2004 |
| JP | 2005354678 | A | 12/2005 |
| JP | 2006005791 | A | 1/2006 |
| WO | 9912303 | | 3/1999 |
| WO | WO02093784 | A1 | 11/2002 |
| WO | 03069818 | | 8/2003 |
| WO | 2005004376 | A1 | 1/2005 |
| WO | 2005022681 | A2 | 3/2005 |
| WO | 2005034386 | A1 | 4/2005 |
| WO | WO2005076491 | | 8/2005 |
| WO | WO2005081424 | A2 | 9/2005 |

OTHER PUBLICATIONS

Zhilu et al., Automatic Digital Modualtion Recognition Based on Support Vector Machines, IEEE, 2005, pp. 1025-1028.*
Yongmei Dai et al. 'A List Sphere Decoder based turbo receiver for group wise space time trellis coded (GSTTC) systems' IEEE (2004). pp. 804-808.
Gueguen A., Comparison of Suboptimaliterative Space-Time receivers, ?Vehicular Technology Conference, 2003, VTC 2003—Spring, The 57th IEEE Semiannual, Apr. 25, 2003,vol. 2, pp. 842 ? 846.

(Continued)

*Primary Examiner* — Chieh M Fan
*Assistant Examiner* — Freshteh N Aghdam
(74) *Attorney, Agent, or Firm* — Kenyon S. Jenckes

(57) ABSTRACT

Systems and methodologies are described that facilitate code rate and modulation order dependent selection of a suitable demodulator for a received data packet. According to various aspects, systems and/or methods are described that enable selection of an optimal demodulation scheme such that signal receiver complexity is not increased and optimal decoding throughput performance is achieved.

10 Claims, 18 Drawing Sheets

(56) References Cited

OTHER PUBLICATIONS

Kawamoto Junichiro, et al., "Comparative Evaluation of amount of computation processing and throughput of QRM-MLD using a multipath interference canceller in broadband DS-VDMA." Institute of Electronic Information Communication, Jul. 9, 2004. No. 104. vol. 184, pp. 29-34.

Seethaler D., et al., "Low-complexity soft demodulation of MIMO-BICM using the line-search detector", Communications, 2005. ICC 2005. 2005 IEEE International Conference on, May 20, 2005, vol. 4, pp. 2447-2451.

Taiwanese Search report—096102598—TIPO—Dec. 17, 2010.

Wiesel, A., et al., "Efficient implementation of sphere demodulation" Signal Processing Advances in Wireless Communications, 2003. SPAWC 200 3. 4th IEEE Workshop on Rome. Italy Jun. 15-18, 2003, Piscataway, NJ, USA, IEEE, US, Jun. 15, 2003, pp. 36-40, XP010713463.

Kawamoto J., et al., "Comparison of QRM-MLD Employing Multipath Interference Canceller on Throughput and Comparison Complexity in Broadband DS-CDMA", Technical Report of the Institute of Electronics, Information and Communication Engineers, Jul. 9, 2004, No. 104, vol. 184, pp. 29-34.

Arogyaswami, et al.: "An Overview of MIMO Communications—A Key to Gigabit Wireless," Proceedings of the IEEE. vol. 92, No. 2, pp. 198-218, Feb. 2004.

Benjebbour, et al.: "On the Relation between Ordering Metrics for ZF and MMSE Successive Detection in MIMO Systems," IEICE Trans. Communications, vol E87-B, No. 7, pp. 2021-2027, XP001199371, Jul. 2004.

Dobre, et al.: "Blind modulation classification: a concept whose time has come," IEEE/Sarnoff Symposium on Advances in Wired and Wireless Communication, pp. 223-228, Apr. 18-19, 2005.

Hochwald, et al.: "Achieving near-capacity on a multiple-antenna channel," IEEE Transactions on Communications, vol. 51 Issue 3, pp. 389-399, Mar. 2003.

Hong, et al.: "Classification of BPSK and QPSK Signals with Unknown Signal Level using the Bayes Technique," Proceedings of the 2003 IEEE International Symposium on Circuits and Systems, vol. 4, pp. IV-1-IV4, XP002447336, May 25, 2003.

Koshy, et al.: "A Low Complexity Iterative Receiver for High Spectral-Efficiency Battlefield MIMO Communications," Military Communications Conference, Milcom 2005, pp. 1-7, XP010901313, Oct. 17, 2005.

Liu, et al.: "A Kalman-PDA Approach to Soft-Decision Equalization for Frequency-Selective MIMO Channels," IEEE Transactions on Signal Processing, vol. 53, No. 10, pp. 3819-3830, Oct. 2005.

Peng, et al.: "Augmenting Naïve Bayes Classifiers with Statistical Language Models," Springer Netherlands Publisher, Information Retrieval, vol. 7, Issue 3-4, pp. 317-345, Sep.-Dec. 2004.

Rice: "Introduction to Automatic Signal Classification," 1999 International Conference on Signal Processing Applications and Technology, pp. 1-17, XP009088338, Nov. 2, 1999.

Rice: "Techniques for Developing an Automatic Signal Classifier," 1999 International Conference on Signal Processing Applications and Technology, pp. 1-26, XP009088349, Nov. 2, 1999.

Rish: "An empirical study of the naïve Bayes classifier," Workshop on "Empirical Methods in AI" IJACI-01, pp. 41-46, XP002447337, 2001.

Toledo, et al.: "Effect of MIMO wireless channels on TCP," IEEE Wireless Communications and Networking Conference 2004, vol. 3, pp. 1867-1872, ISBN: 0/7803-8344-3, Mar. 21-25, 2004.

Tsay, et al.: "Enhancing techniques for efficient topic hierarchy Integration," Third IEEE Conference on Data Mining, pp. 657-660, Nov. 19-22, 2003.

Waters, et al.: "The Chase Family of Detection Algorithms for Multiple-Input Multiple-Output Channels," IEEE Communications Society, Globecom 2004, pp. 2635-2639, XP010758003, Nov. 29, 2004.

Wu, et al.: "Automatic Digital Modulation Recognition Based on Support Vector Machines," International Conference on Neural Networks and Brain 2005, vol. 2, pp. 1025-1028, Oct. 13-15, 2005.

Yaqin, et al.: "Automatic Digital Modulation Recognition Using Artificial Neural Networks," IEEE Int. Conf. Neural Networks & Signal Processing, pp. 257-260, Nanjing, China, Dec. 14-17, 2003.

Zimmermann, et al.: "On the Complexity of Sphere Decoding," Proceedings of the 7th International Symposium on Wireless Personal Multimedia Communications 2004, XP002434986, pp. 1-5, Sep. 12, 2004.

International Search Report—PCT/US2007/060929, International Searching Authority—European Patent Office—Aug. 30, 2007.

Written Opinion—PCT/US2007/060929; International Searching Authority—European Patent Office—Aug. 30, 2007.

International Preliminary Report on Patentability—PCT/US2007/060929, International Bureau of WIPO—Geneva, Switzerland—Jul. 29, 2008.

Partial International Search Report—PCT/US2007/060929, International Searching Authority—European Patent Office—Jun. 20, 2007.

\* cited by examiner

| | |
|---|---|
| Slot duration | 0.5 ms |
| TTI | 0.5 ms |
| Symbols / Slot | 7 |
| FFT size | 512 |
| Tone spacing | 15 KHz |
| Flat guard samples (Number of symbols) | 29 (4) 28 (3) |
| Flat guard period (Number of symbols) | 3.78 µs (4) 3.65 µs (3) |
| Window length (Number of samples) | 1.04 µs (8) |
| Guard tones per symbol | 212 |
| CQI description | 5 bits |

Evaluation Numerology

FIG. 6

|  | 2x2 | 4x4 |
|---|---|---|
| Pilot tones per symbol per antenna | 25 | 12 |
| Pilot staggering | 2 | 4 |
| Data tones per symbol per antenna | 250 | 252 |
| Pilot Ec/Ior | - 10 dB | - 8.23 dB |
| Data Ec/Ior | - 3dB | - 3dB |

FIG. 7

| Packet format index | Spectral efficiency per antenna on the 1st transmission (bits/tone) | Payload size per antenna (250 tones/OFDM symbol, 7 OFDM symbols/TTI) | Modulation order |
|---|---|---|---|
| 0 | 0.21 | 367 | 2 |
| 1 | 0.40 | 700 | 2 |
| 2 | 0.48 | 840 | 2 |
| 3 | 0.59 | 1032 | 2 |
| 4 | 0.71 | 1242 | 2 |
| 5 | 0.84 | 1470 | 2 |
| 6 | 1.00 | 1750 | 2 |
| 7 | 1.18 | 2065 | 2 |
| 8 | 1.37 | 2397 | 4 |
| 9 | 1.58 | 2765 | 4 |
| 10 | 1.81 | 3167 | 4 |
| 11 | 2.06 | 3605 | 4 |
| 12 | 2.31 | 4042 | 6 |
| 13 | 2.59 | 4532 | 6 |
| 14 | 2.87 | 5022 | 6 |
| 15 | 3.16 | 5530 | 6 |
| 16 | 3.46 | 6055 | 6 |
| 17 | 3.76 | 6580 | 6 |
| 18 | 4.07 | 7122 | 6 |
| 19 | 4.39 | 7682 | 6 |
| 20 | 4.71 | 8242 | 6 |
| 21 | 5.03 | 8802 | 6 |
| 22 | 5.35 | 9362 | 6 |
| 23 | 5.68 | 9940 | 6 |
| 24 | 6.00 | 10500 | 6 |
| 25 | 6.33 | 11077 | 6 |
| 26 | 6.65 | 11637 | 6 |
| 27 | 6.99 | 12232 | 6 |
| 28 | 7.32 | 12810 | 6 |
| 29 | 7.65 | 13387 | 6 |
| 30 | 7.98 | 13965 | 6 |
| 31 | 8.31 | 14542 | 6 |

MCS Formats

FIG. 8

Throughput vs. geometry (2x2, 3km/h, QRM-*m* indicates QRM-MLD receiver with *m* candidates).

Throughput vs. geometry (2x2, 30km/h, QRM-*m* indicates QRM-MLD receiver with *m* candidates).

Throughput vs. geometry (4x4, 3km/h, QRM-*m* indicates QRM-MLD receiver with *m* candidates).

Throughput vs. geometry (4x4, 30km/h, QRM-*m* indicates QRM-MLD receiver with *m* candidates).

| Ior/No | Most Frequently Used Code Rate and Modulation Order (2x2) | Most Frequently Used Code Rate and Modulation Order (4x4) |
|---|---|---|
| 0 | R=0.3, QPSK (3) | R=0.2, QPSK (1) |
| 5 | R=0.59, QPSK (7) | R=0.5, QPSK (6) |
| 10 | R=0.51, 16QAM (11) | R=0.4, 16QAM (9) |
| 15 | R=0.48, 64QAM (14) | R=0.38, 64QAM (12) |
| 20 | R=0.68 64QAM (18) | R=0.58, 64QAM (16) |
| 25 | R=0.78, 64QAM (20) | R=0.73, 64QAM (19) |

Most Frequently Used MCS (Numbers in parentheses indicate the packet format indices in Fig. 8.)

FIG. 13

METHOD OF PACKET FORMAT DEPENDENT SELECTION OF MIMO-OFDM DEMODULATOR

This application claims the benefit of U.S. provisional application Ser. No. 60/761,566, filed on Jan. 23, 2006, and entitled PACKET FORMAT DEPENDENT SELECTION OF MIMO-OFDM DEMODULATOR, the entirety of this application is incorporated herein by reference.

BACKGROUND

I. Field

The following description relates generally to wireless communications, and more particularly to selecting a desired demodulation scheme at a receiver system.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems time division multiple access (TDMA) systems, frequency division multiple access (FDMA) systems, and orthogonal frequency division multiple access (OFDMA) systems.

Generally a wireless multiple-access communication system can simultaneously support communication for multiple wireless terminals. Respective terminals communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antenna are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

The most popular MIMO-OFDM receiver architecture is the linear Minimum Mean Square Error (MMSE) spatial equalizer. However, the recently-developed list sphere decoding (LSD) significantly reduce the MIMO decoding error probability, especially when the channel code rate (ratio of number of bits entering a signal encoder to number of bits exiting the signal encoder) is high, modulation order (which represents a number of (coded) bits transmitted using a modulation symbol) is low, and the number of candidates in the list is large, at the cost of increased receiver complexity. In order to reduce complexity, a simplified version of LSD called QRM-MLD with quandrant detection method was proposed. According to the complexity analysis (in terms of number of multiplications), the QRM-MLD with 20-30 candidates has the complexity comparable to that of the MMSE spatial equalizer for the 4 transmit and 4 receive antennas. Furthermore, the complexity of the QRM-MLD increases in proportion to the number of the candidates.

The LSD may be applied for various purposes. First, the LSD can enhance the throughput performance of the single codeword (SCW) based MIMO receiver (i.e., a high-end SCW MIMO application). Second, the LSD can minimize the throughput loss of the multiple codeword (MCW) based MIMO receiver when the receiver does not employ a successive interference cancellation (SIC) (e.g., a low-end MCW MIMO application). In fact as the memory requirement and operational complexity of the SIC receiver incorporated with HARQ operations are quite challenging, the LSD would be very useful if it could achieve the throughput performance comparable to the SIC receiver with a moderate number of candidates. A need in the art exists for selecting the optimal demodulation scheme in light of transmit format (e.g., code rate and modulation order) characteristics of received data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance an aspect, a communications methodology, comprises; receiving a packet format which will be used for demodulation; and selecting either a Minimum Mean Square Error (MMSE) spatial equalizer, or a list sphere decoder (LSD) based on the received packet format.

In another aspect, an apparatus, comprises: a receiving component that receives a packet format used for demodulation; an analysis component that determines an optimal one of a plurality of demodulation schemes based at least in part upon the packet format; and a demodulation component that employs the optimal demodulation scheme.

According to another aspect; a computer readable medium has stored thereon computer executable instructions for performing the following acts: receiving a packet format which will be used for demodulation; and selecting either a MMSE spatial equalizer, or a list sphere decoder (LSD) based on the received packet format.

In another aspect, a processor has stored thereon computer executable instructions for performing the following acts: receiving a packet format which will be used for demodulation; and selecting either a MMSE spatial equalizer, or a list sphere decoder (LSD) based on the received packet format.

In yet still another aspect, an apparatus, comprises: means for receiving a data packet at a mobile device; and means for selecting an appropriate demodulator based at least in part upon format information of the received data packet.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

FIG. 6 is a table that describes the numerology and resource allocation for link throughput simulation.

FIG. 7 is another table that describes the numerology and resource allocation for link throughput simulation.

FIG. 8 is a table that describes a Modulation and Coding Scheme (MCS) format table used for adaptive modulation and coding of each of a plurality of antennas in a MIMO systems.

FIG. 13 is a table that describes the most frequently used modulation and coding schemes for data transmission.

Figure 1:
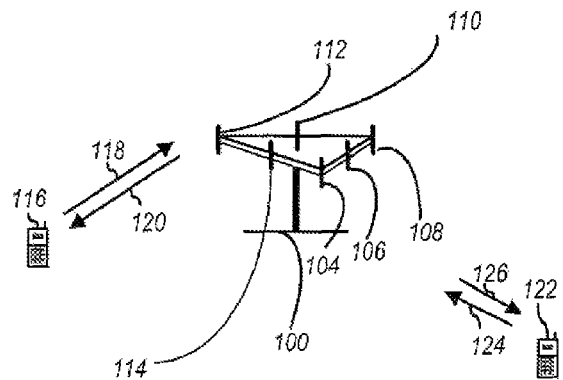
FIG. 1 is an illustration of, a multiple access wireless communication system according to one embodiment.

Reference, A is a presentation related to aspects described herein, and this reference forms part of this specification.

DETAILED DESCRIPTION

Various embodiments are now described with reference to the drawings, wherein like reference numerals are used to refer to like elements throughout. In the following description, for purposes of explanation, numerous specific details are set forth in order to provide thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "components," "module," "system." and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming, and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing containing, and/or carrying instruction(s) and/or data.

Referring to FIG. 1, a multiple access wireless communication system according to one embodiment is illustrated. A access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118.

Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. A access terminal may also be called a access terminal, a user equipment (UE), a wireless communication device, terminal, access terminal or some other terminology.

Figure 2:
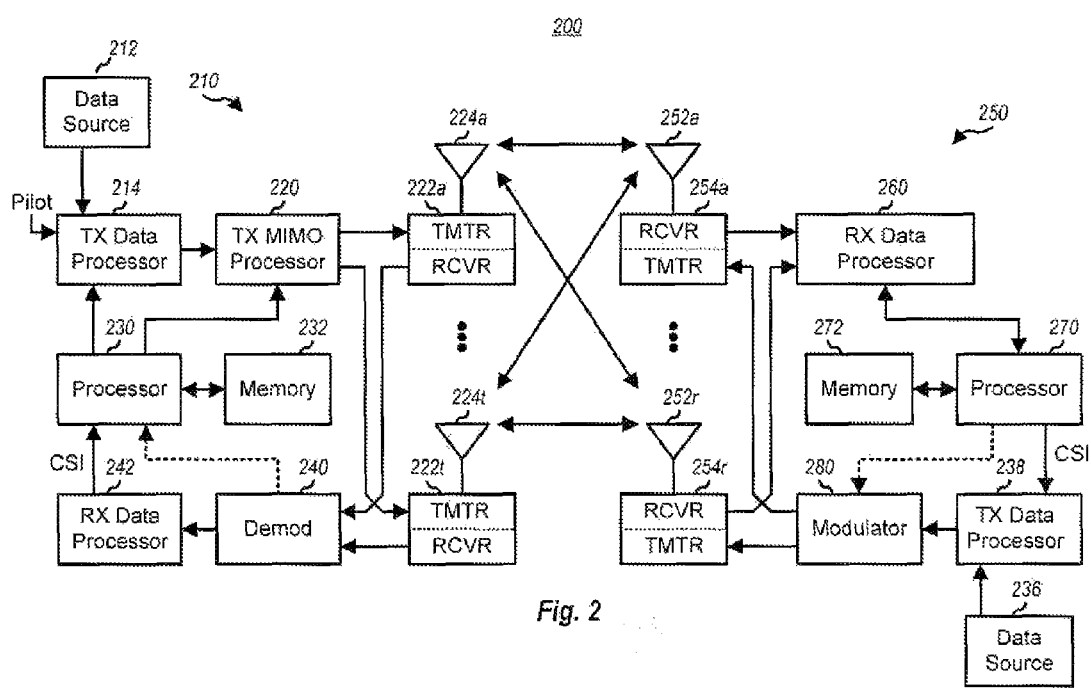
FIG. 2 is a block diagram of an example communication system

FIG. 2 is a block diagram of an embodiment of a transmitter system 210 (also known as the access point) amid a receiver system 250 (also known as access terminal) in a MIMO system 200. At the transmitter system 210 traffic data for a number of data streams is provided from a data source 212 to a transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed plot and coded data for each data stream is then modulated (i.e., symbol mapped) based on a particular modulation scheme (e.g., BPSK, QSPK, M-PSK, or M-QAM) selected for at data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Transmitter 222 receives and processes a respective symbol stream to provide one or more analog signals, and further conditions (e.g. amplifies, filters, and upconverts) the analog signals to provide a modulated signal suitable for transmission over the MIMO channel. $N_T$ modulated signals from transmitters 222a through 222t are then transmitted from $N_T$ antennas $224_a$ through 224t, respectively. At receiver system 250, the transmitted modulated signals are received by $N_R$ antennas 252a through 252r and the received signal from each antenna 252 is provided to a respective receiver (RCVR) 254a through 254r. Each receiver 254 conditions (e.g. filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210. Processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
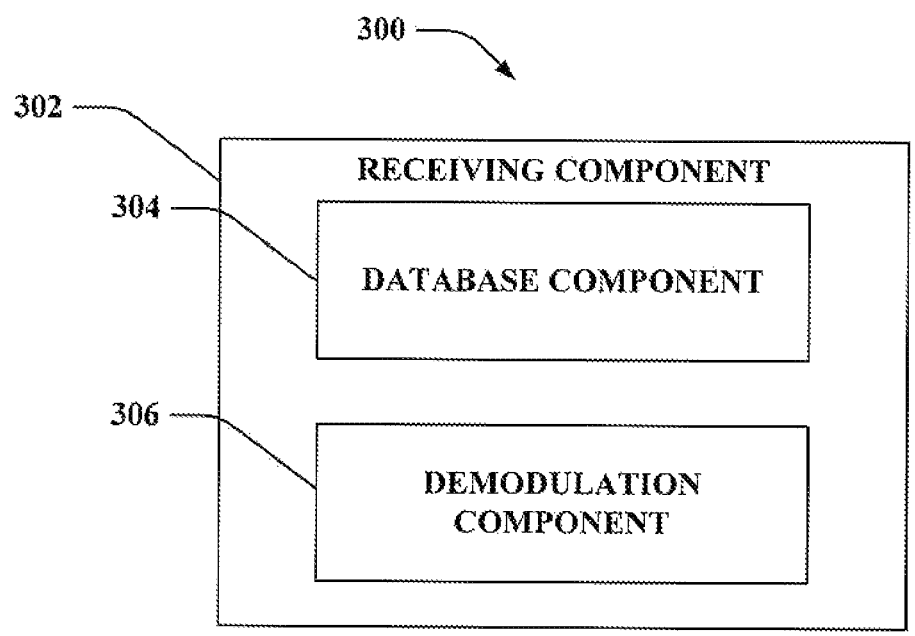
FIG. 3 is an illustration of an example system that effectuates selection of an appropriate data packet demodulation scheme in a wireless communication environment.

Referring now to FIG. 3, a system 300 that effectuates selecting an optimal demodulator depending upon transmit format in accordance with various embodiments herein. Receiving component 302 associated with a mobile terminal (not shown) is comprised of a database component 304 and a demodulation component 306. Database component 304 can determine an optimal demodulation scheme to be subsequently employed by the demodulation component 306. More particularly, database component 304 can determine a desired demodulation scheme based at least in part upon characteristics of received data. Demodulation component 306 can employ a suitable demodulation scheme in accordance with the determination at database component 304. In one embodiment, demodulation component 306 selects between a list sphere decoder (LSD) and a MMSE spatial equalizer. However, it is to be appreciated that any demodulation scheme can be applied in system 300.

Figure 4:
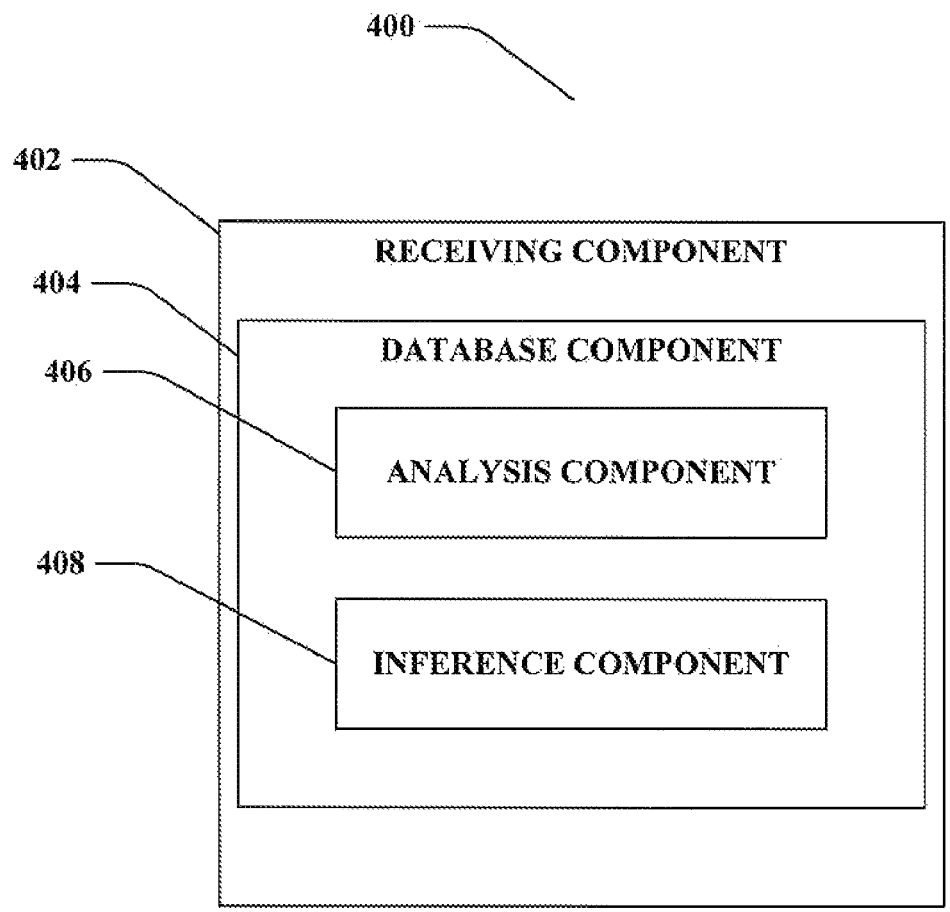
FIG. 4 is another illustration of an example system that effectuates selection of an appropriate data packet demodulation scheme in a wireless communication environment.

With reference to FIG. 4, system 400 comprises receiving component 402. In an exemplary embodiment, receiving component 402 can be a MIMO-OFDM system; however it is to be appreciated that any receiver architecture can be employed in system 400. Receiving component 402 comprises a database component 404. Database component 404 can further comprise an analysis component 406 and an inference component 408. In one embodiment, analysis component 406 can employ look-up tables to determine an appropriate demodulator that should be applied based on characteristics of the received data. More particularly, for example, look-up tables that store data concerning transmit format (e.g., code rate and modulation order) are compared to the transmit format characteristics of the received data in order to determine whether an MMSE or LSE demodulator should be employed. Alternatively, for example, inference component 406 can be employed to determine an appropriate demodulator that should be employed when analysis component 404 is unable to make such a determination. In one embodiment, inference component 406 can employ classifier(s) of any suitable type, including, for example, a priori rule-based classifiers and probabilistic dependency model based classifiers to determine an appropriate de-modulation scheme. Further examples of classifier systems include expert system classifiers, naive Bayes classifiers, maximum likelihood classifiers, neural network classifiers, support vector machine (SVM) classifiers, statistical language model classifiers, and decision tree classifiers.

Figure 5:
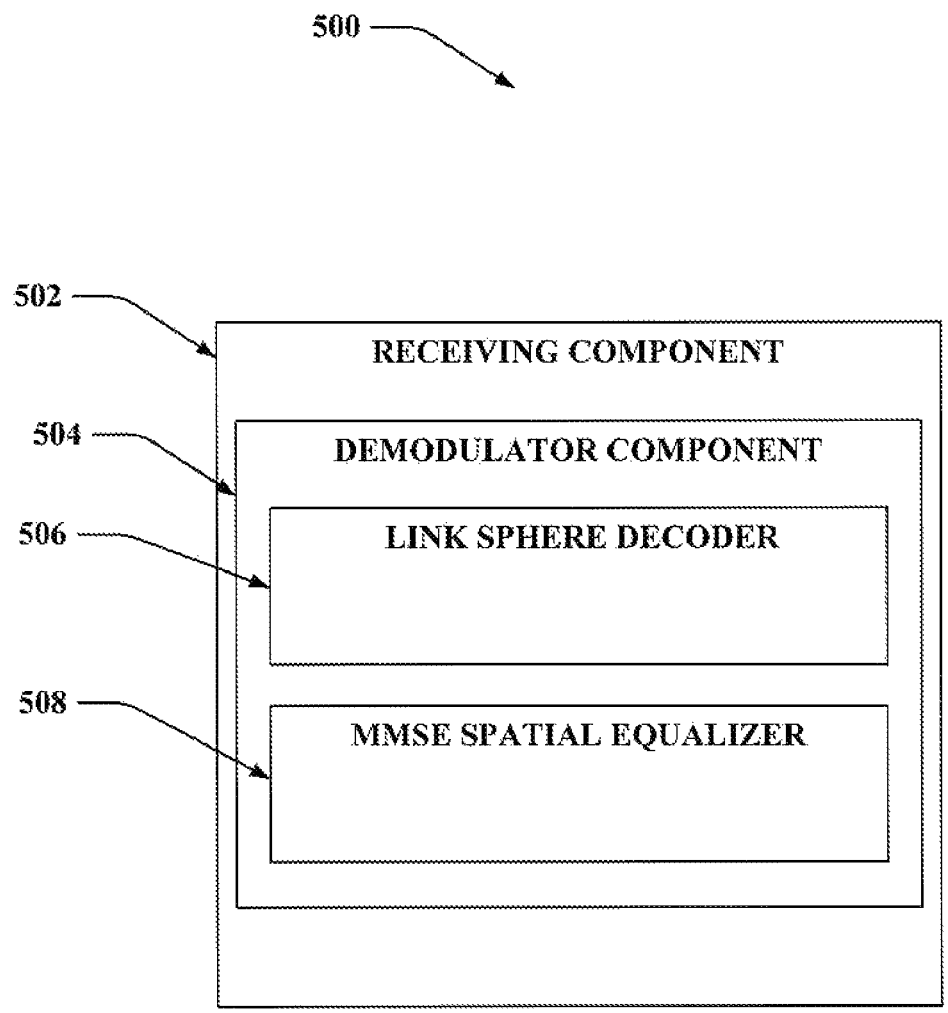
FIG. 5 is another illustration of an example system that effectuates selection of an appropriate data packet demodulation scheme in a wireless communication environment.
Figure 9:
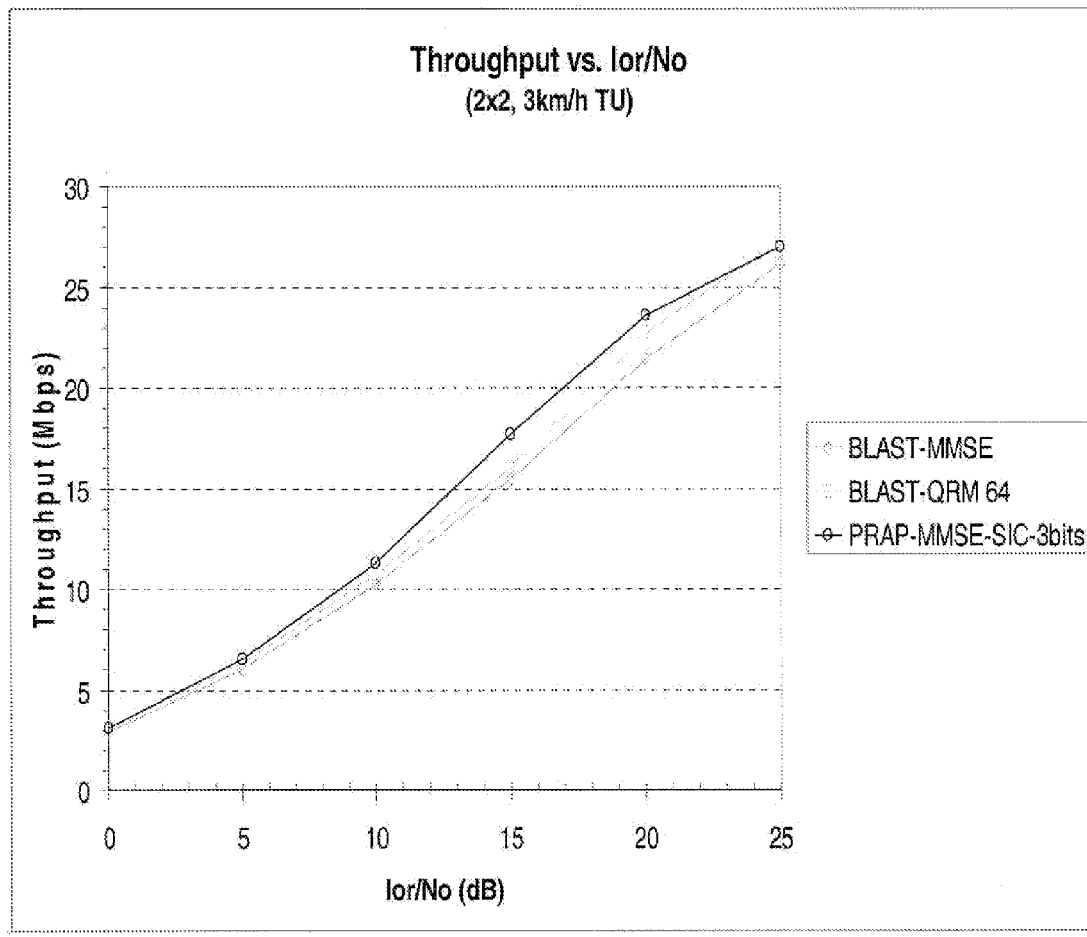
FIG. 9 is an example plot that compares throughput performances with various receiver-demodulator schemes.
Figure 10:
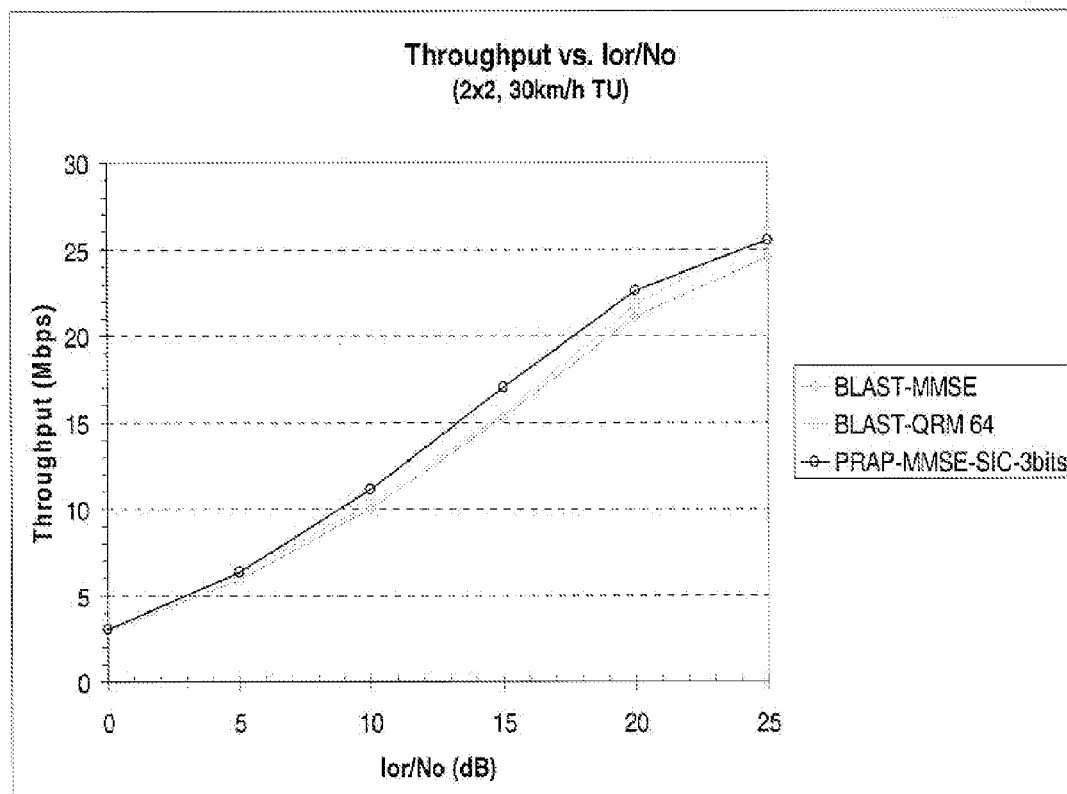
FIG. 10 is an example plot that compares throughput performances with various receiver-demodulator schemes.
Figure 11:
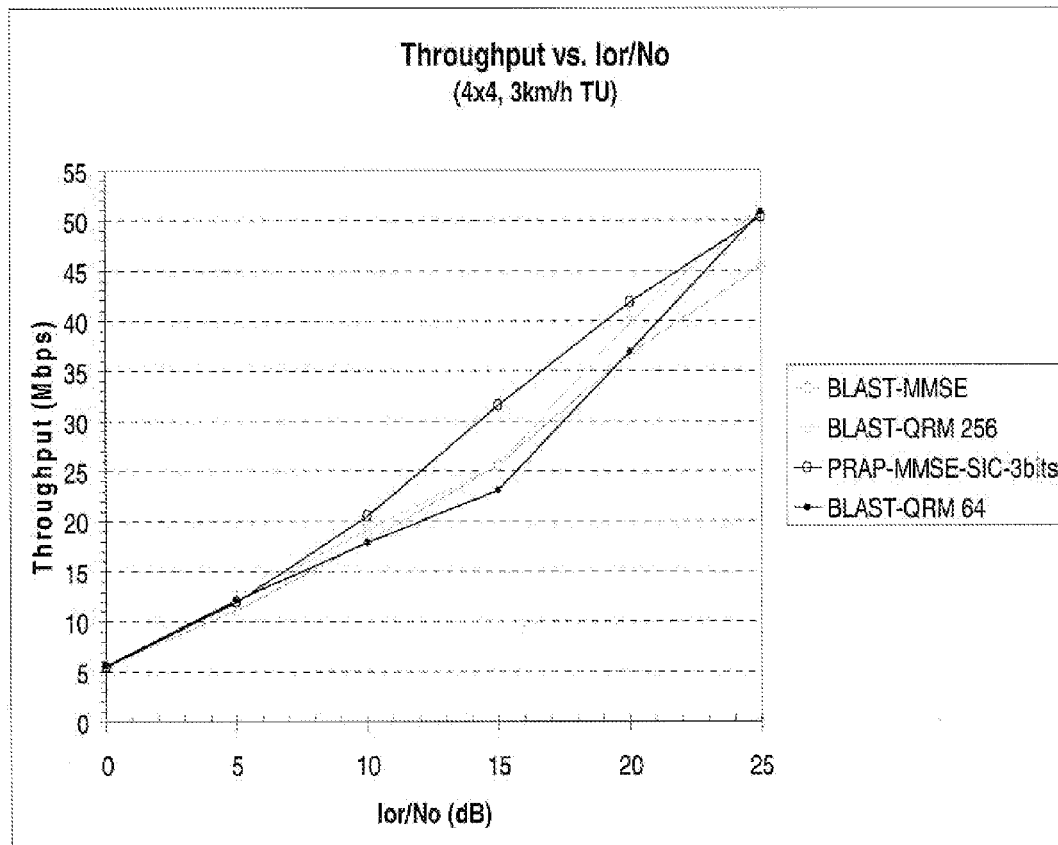
FIG. 11 is an example plot that compares throughput performances with various receiver-demodulator schemes.
Figure 12:
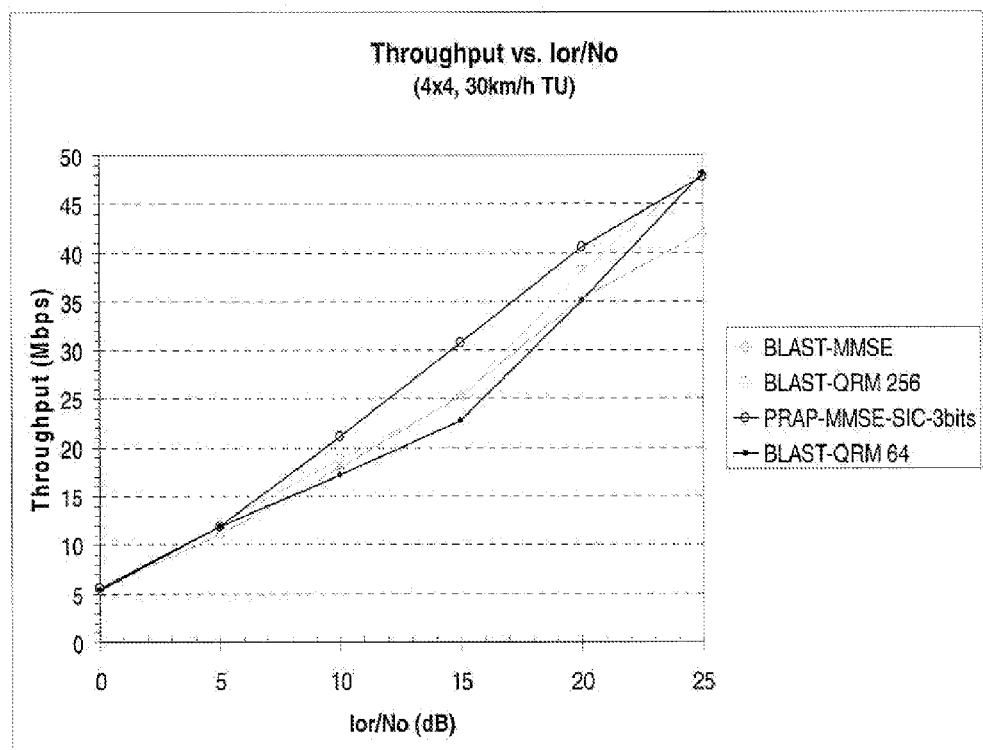
FIG. 12 is an example plot that compares throughput performances with various receiver-demodulator schemes.

Referring now to FIG. 5, system 500 comprises a receiver component 502. In accordance with an exemplary embodiment, receiver component 502 can be a MIMO-OFDM receiver system. However, it is to be appreciated that any receiver system can be used in system 500. Receiver component 502 comprises a demodulator component 504. It is to be appreciated that demodulator component 504 is capable of employing any demodulation scheme. In an exemplary embodiment, demodulator component 502 employs one of an LSD 504 and an MMSE spatial equalizer 506 based at least in part upon transmit format characteristics of a received data. The following is an exemplary strategy of the demodulator selection in the OFDM-MIMO receiver when there are four transmit and four receive antennas, which assumes that the maximum allowable number of candidates (e.g. complexity) for the LSD is 64.

If the code rate is equal to or larger than $2/3$, the LSD significantly outperforms the MMSE spatial equalizer. Use the LSD with 64 candidates for all the modulation orders. Else, if the code rate is between $1/2$ and $2/3$, use the LSD with 64 candidates for 16 QAM and lower order modulations, while use the MMSE spatial equalizer for the 64QAM. Else (i.e., code rate<$1/2$), if QPSK modulation is used, use the LSD with 64 candidates. Else, the MMSE performance is comparable to or better than that of the LSD. Use the MMSE spatial equalizer.

After the $2^{nd}$ transmission (e.g., retransmission), the code rate is likely to be low enough to use only the MMSE spatial equalizer. As pointed out above, the number of candidates can be adjusted in the LSD operation, if necessary. Furthermore, in a MIMO-OFDM system with 2 transmit and 2 receive antennas, the number of candidates may be reduced more aggressively (e.g., 32). What follows is a discussion about the selective demodulator design as optimized through simulations.

With further reference to FIG. 5, if it is determined that employment of the LSD demodulation scheme is desired, receiver component 502 can further selectively determine the number of candidates (e.g. complexity) depending on the code rate and the modulation order and the number of layers or transmit streams.

Simulation Set-up tables—FIGS. 6 and 7, describe the numerology and the resource allocation for the link throughput simulation. Transmitter, channel, and receiver configurations are as follows:

2×2 (2 layers), and 4×4 (4 layers) antenna configurations for MIMO

MCW-MIMO (PRAP w/a full CQI, an incremental CQI, and multiple ACK) and SCW-MIMO (BLAST)

Receiver Architecture—linear MMSE and QRM-MLD for SCW-MIMO (BLAST), MMSE-SIC for MCW-MIMO (PRAP).

Nx time-frequency scattered FDM pilot structure, where N is the number of transmit antennas (N=1, 2, 4)

Pilot and data tones are uniformly spaced across the entire band

Bandlimited white interference and noise

GSM TU channel—3 kmph, 30 kmph

Channel estimation—MMSE estimation

Channel estimator length—15 OFDM symbols

CQI feedback delay—2 TTIs

CQI feedback frequency—once per TTI

Number of parallel H-ARQ processes—6

Maximum number of retransmissions—4 (including the first transmission)

Adaptive H-ARQ BLER control—20% BLER target after the first transmission.

With reference now to FIG. 8, a table is shown that describes the Modulation and Coding Scheme (MCS) format table used for adaptive modulation and coding of each transmit antenna, which is composed of 32 entries. Thus, 5 bits are allocated for the full Channel Quality Indicator (CQI) description for both Multiple Codeword Transmission-Multiple Input, Multiple Output (MCW-MIMO) transmissions and Single Codeword Transmission-Multiple Input, Multiple Output (SCW-MIMO) transmissions, wherein the MCW-MIMO controls the transmit format of each layer individually, while the SCW-MIMO controls a common transmit format that is applied to all the layers. For the incremental CQI description for MCW-MIMO, 3 bits were allocated (covering from 0 dB-7 db). Note that the packets which use the shaded MCS formats are not decodable due to the limited modulation order (maximum is 6 corresponding to 64QAM) on the $1^{st}$ transmission but provide a fine granularity of data rate in conjunction with the Hybrid Automatic Request (H-ARQ) operation, so the maximum spectral efficiency is limited to 21 Mbps per transmit antenna in the simulation.

With reference now to FIGS. 9-12, the corresponding plots compare the throughput performances of MCW-MIMO with Minimum Mean Square Error-Successive Interference Cancellation (MMSE-SIC) receiver (high-end MIMO), SCW-MIMO with linear MMSE receiver (low-end MIMO) and SCW-MIMO with LSD receiver. The number of candidates of the LSD are set to 64. As can be seen in all the plots, the throughput performance of the LSD receiver is comparable to that of the MMSE-SIC receiver in the low and high geometry but it is poor in the medium geometry (around 15 dB). In particular, in the 4×4 MIMO, the LSD receiver with 64 candidates has even poorer performance than the linear MMSE receiver and we barely achieve a comparable throughput by using 256 candidates, which needs 10 times higher complexity than the MMSE receiver.

With reference to FIG. 13, it becomes clear that the poor performance of the LSD receiver occurs when the code rate is lower than $1/2$ and the modulation is 64QAM, which was also shown in the fixed data rate BLER performance evaluations. (See the code rate and modulation order corresponding to the geometry of 15 dB). On the other hand, the LSD becomes very efficient when the code rate is high or the modulation order is low.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 14:
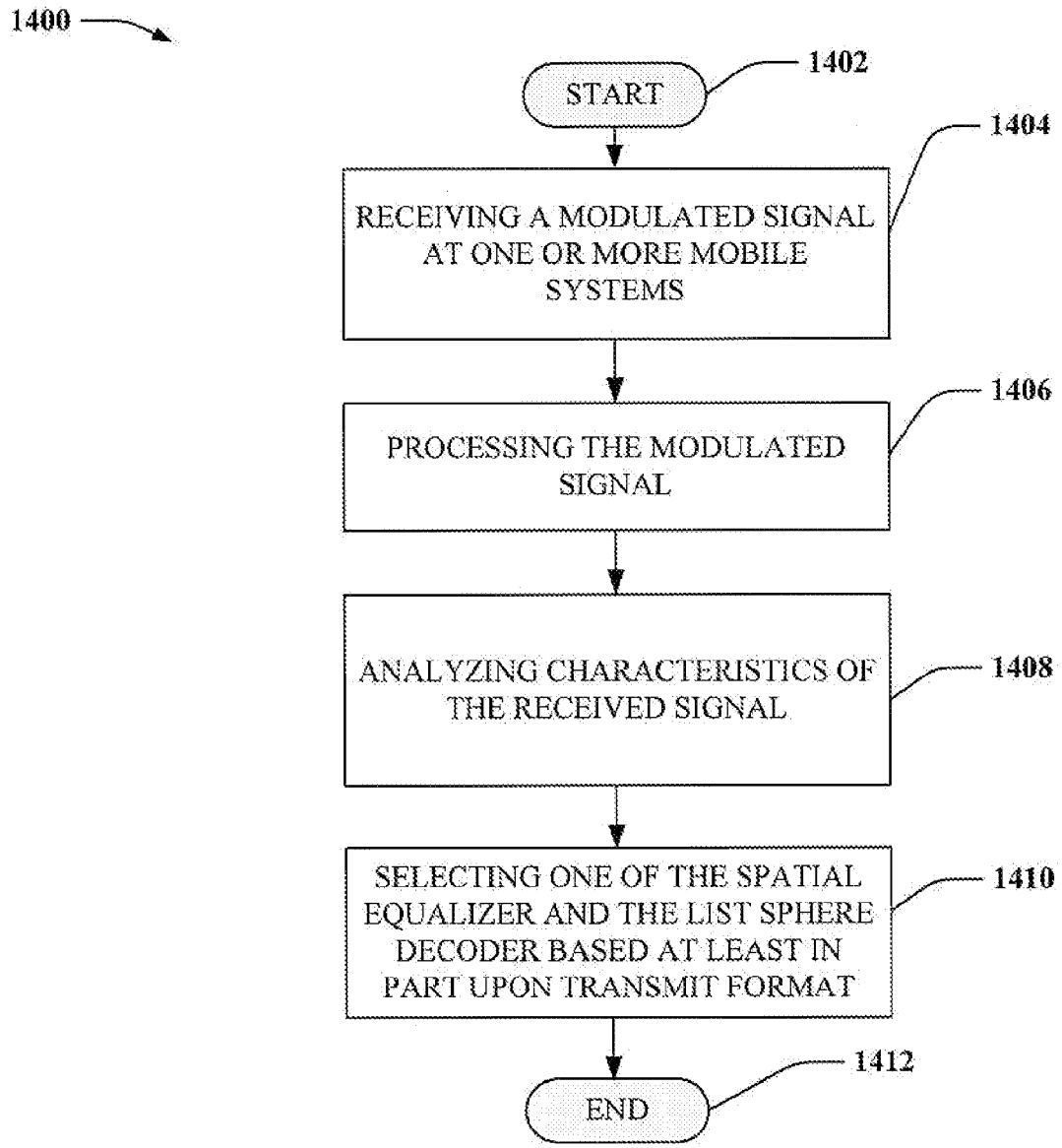
FIG. 14 is an illustration of an example methodology that facilitates demodulation of a received data packet according to data packet transmission format.

With reference now to FIG. 14, a methodology 1400 that facilitates demodulation of a modulated signal in a wireless communications system is illustrated. The methodology 1400 begins at 1402 and at 1404, a modulated signal is received at one or more mobile systems. At 1406, the modulated signal is processed via conditioning procedures such as filtering, amplifying and downconverting the received signal. The conditioned signal is further digitized to provide samples and processed to provide a corresponding symbol stream. At 1408, at the one or more mobile systems, characteristics of the modulated signal are analyzed and at 1410, a suitable demodulation scheme (e.g. LSE or MMSE spatial equalizer) is selected based at least in part upon the transmit format (e.g. code rate and/or modulation order) characteristics of the modulated signal. This determination can include a cost-benefit analysis. The cost can be measured by such factors as the power consumption, decoding error probability, cost associated with receiver complexity, and loss of throughput performance based on whether single or multiple codewords are involved. The benefit can be measured by such factors as the reduction in decoding error probability, optimizing throughput performance and preventing the increase of receiver complexity. The decision can be made based on a probabilistic-based analysis where the transition is initiated if a confidence level is high, and not initiated if the confidence level if low. As discussed above, AI-based techniques (including machine-learning systems) can be employed in connection with such determination or inference. Alternatively, a more simple rule-based process can be employed where if certain conditions are satisfied a transition between demodulation schemes will occur, and if not the transition will not be initiated.

Figure 15:
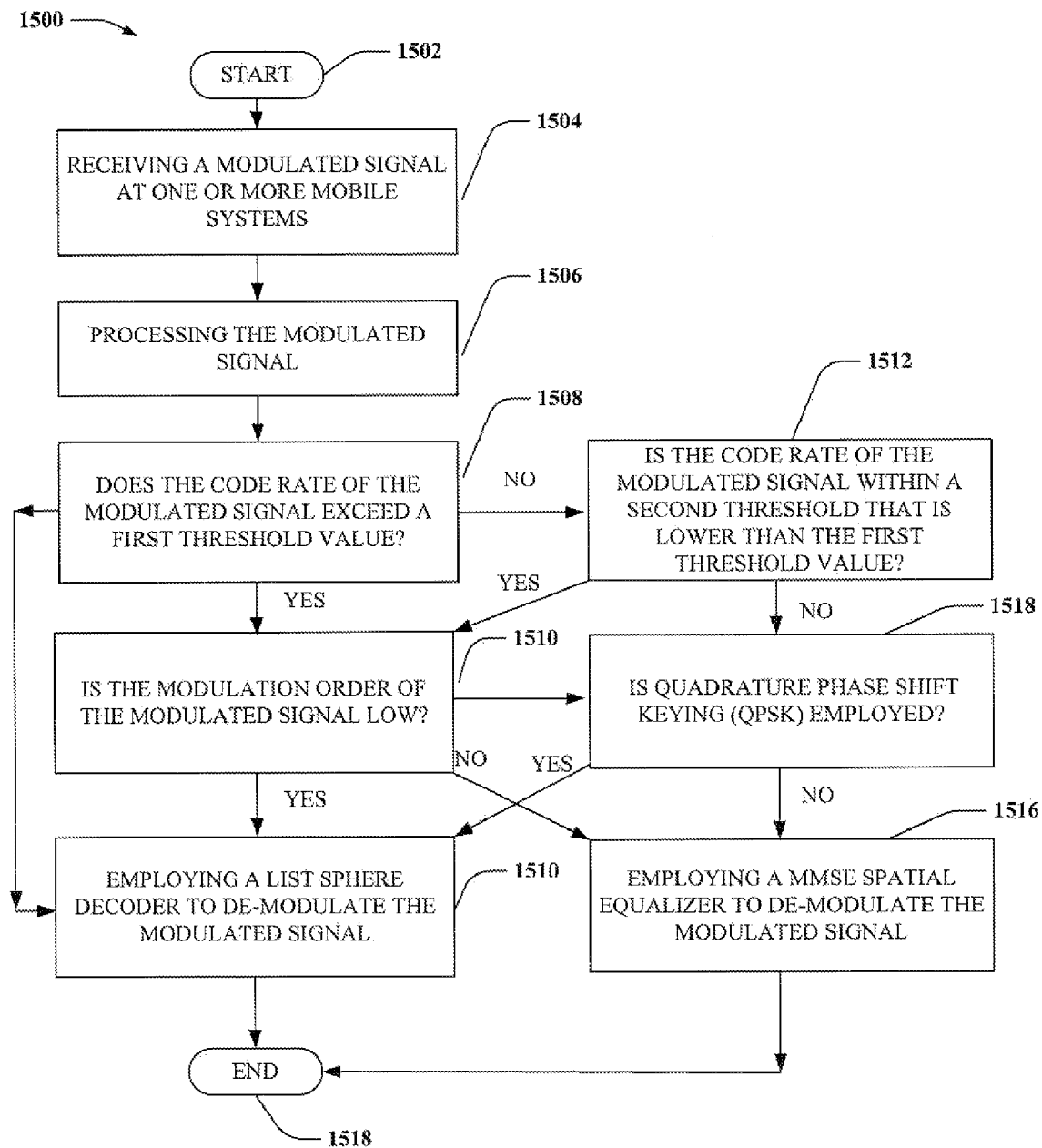
FIG. 15 is another illustration of an example methodology that facilitates demodulation of a received data packet according to data packet transmission format.

With reference now to FIG. 15, a methodology 1500 that facilitates demodulation of a modulated signal in a wireless communication system is illustrated. Methodology 1500 starts at 1502, and a modulated signal is received at one or more mobile systems at 1504. At 1506, the modulated signal is processed via conditioning procedures such as filtering, amplifying and downconverting the received signal. The conditioned signal is further digitized to provide samples and processed to provide a corresponding symbol stream. At 1508 transmit format characteristics of the received modulated signal are analyzed. More particularly, if it is determined that the code rate of the signal exceeds a first threshold value (e.g. two-thirds), the methodology 1500 moves to 1510. At 1510, the methodology 1500 employs a LSD to demodulate the received modulated signal. However, if the code rate does not exceed the first threshold value at 1508, the methodology 1500 moves to 1512. At 1512, if it is determined that the code rate of the modulated signal is within a second threshold (e.g. greater than one-half and less than two-thirds), which is lower than the first threshold value (e.g. two-thirds), the methodology 1500 moves to 1514. At 1514, if it is determined that the modulation order of the signal is low (e.g. 16 QAM), a LSD is employed to demodulate the received modulated signal 1510. Otherwise, for a signal with a higher modulation order (e.g. 64 QAM), a MMSE spatial equalizer is employed to demodulate the signal at 1516. If the determination at 1512 is NO, the methodology 1500 moves to 1518. At 1518, a determination is made as to whether quadrature phase shift keying (QPSK) has been employed. If the determination at 1518 is YES, the methodology 1500 moves to 1510, where an LSD is employed to demodulate the received modulated signal. To the contrary, if the determination at 1518 is NO, the methodology 1500 moves to 1516 wherein an MMSE spatial equalizer is employed to demodulate the modulated signal.

Figure 16:
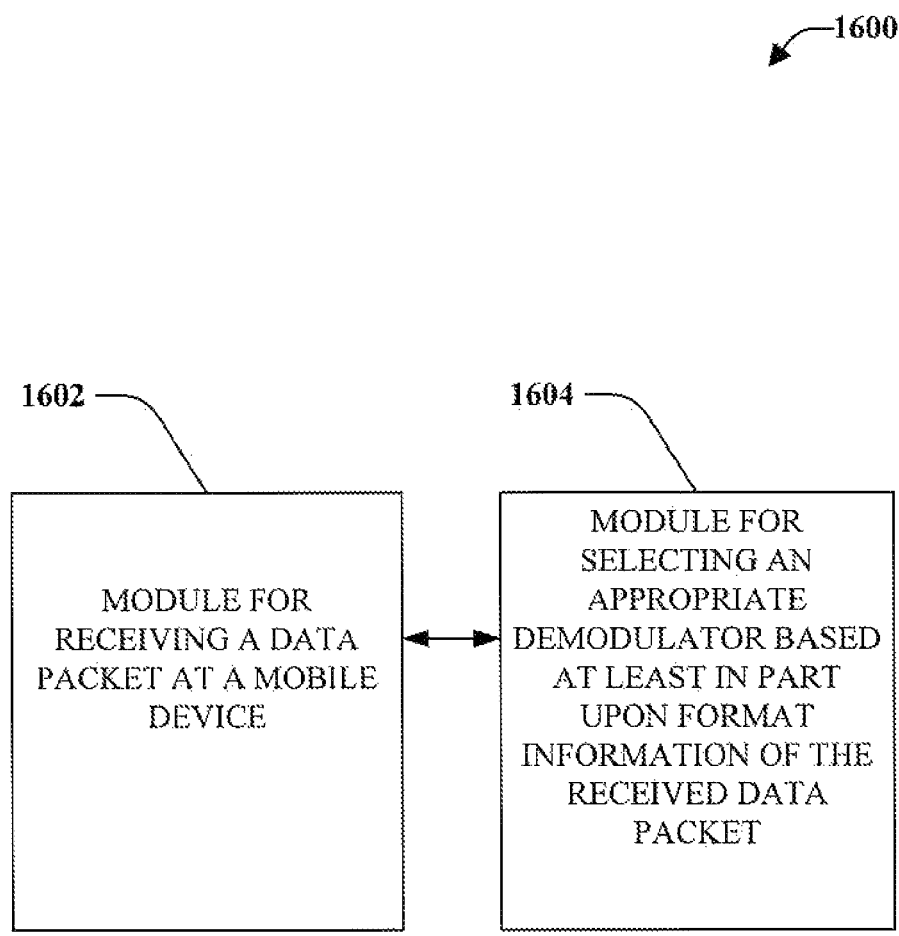
FIG. 16 is a block diagram of a system that facilitates demodulation of a received data packet according to data packet transmission format.

With reference now to FIG. 16, a system 1600 that facilitates selection of an optimal demodulator is illustrated. System 1600 can include a module 1602 for receiving a data packet at a mobile device. It is to be appreciated that a mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. System 1600 can also include a module 1604 for selecting an appropriate demodulator (e.g. an MMSE spatial equalizer, LSD) based at least in part upon format information of the received data packet.

Figure 17:
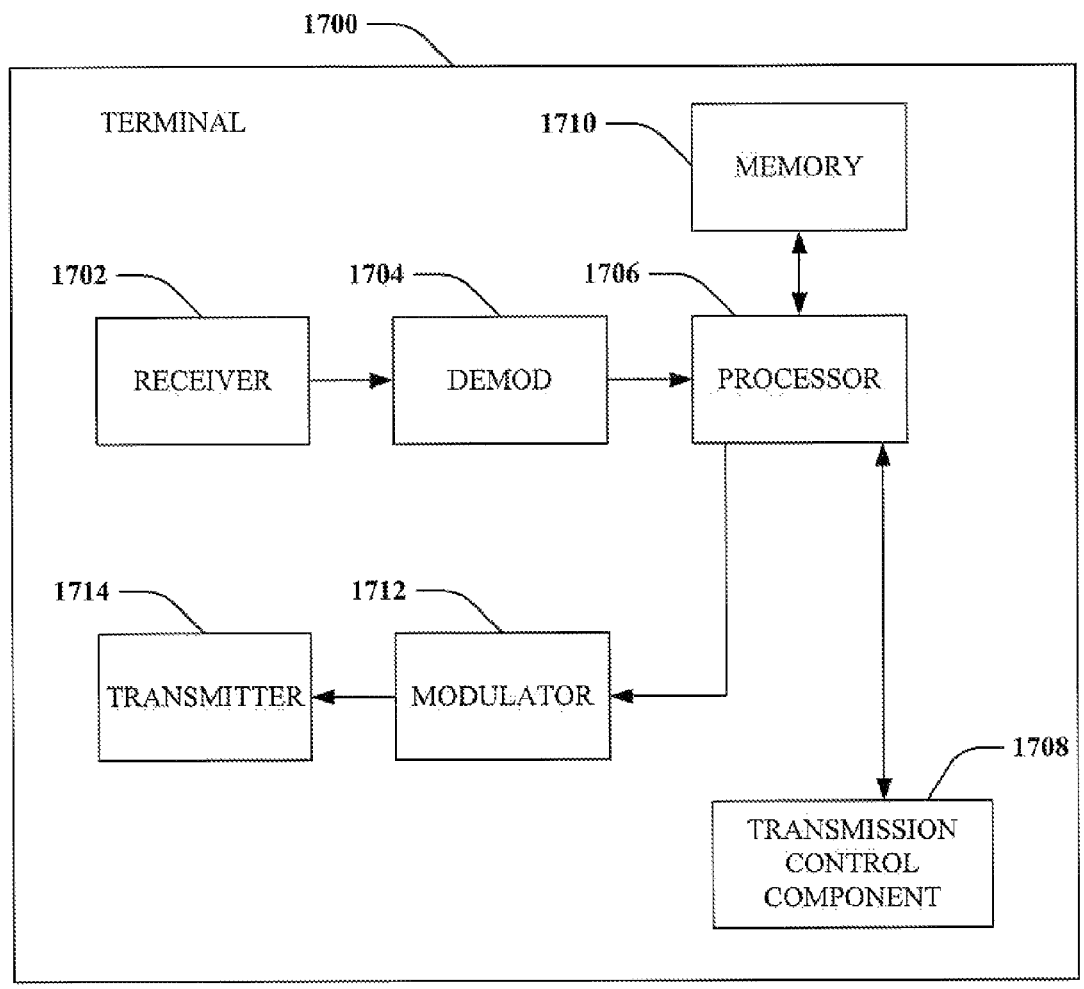
FIG. 17 illustrates a system that provides for other sector communication in accordance with one or more aspects presented herein.

FIG. 17 is an illustration of a terminal or user device 1700 that provides for other sector communication in a wireless communication environment in accordance with one or more aspects set forth herein. Terminal 1700 comprises a receiver 1702 that receives a signal, for instance one or more receive antennas, and performs typical actions (e.g., filters, amplifies, downconverts, etc.) the received signal and digitizes the conditioned signal to obtain samples. A demodulator 1704 can demodulate the samples and provide received pilot symbols to a processor 1706.

Processor 1706 can be a processor dedicated to analyzing information received by receiver component 1702 and/or generating information for transmission by a transmitter 1704. Processor 1706 can be a processor that controls one or more components of terminal 1700, and/or a processor that analyzes information received by receiver 1702, generates information for transmission by a transmitter 1714, and controls one or more components of terminal 1700. Processor 1706 can utilize any of the methodologies described herein, including those described with respect to FIGS. 14 and 15.

In addition, terminal 1700 can include a transmission control component 1708 that analyzes received input, including acknowledgements of successful transmissions. Acknowledgements (ACK) can be received from the serving sector and/or a neighboring sector. Acknowledgements can indicate that a previous transmission has been successfully received and decoded by one of the access points. If no acknowledgement is received, or if a negative acknowledgement (NAK) is received, the transmission can be resent. Transmission control component 1708 can be incorporated into the processor 1706. It is to be appreciated that transmission control component 1708 can include transmission control code that performs analysis in connection with determining receipt of acknowledgement.

Terminal 1700 can additionally comprise memory 1710 that is operatively coupled to processor 1706 and that can store information related to transmissions, an active set of sectors, methods for controlling transmissions, lookup tables comprising information related thereto, and any other suitable information related to transmissions and active set sectors as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1710 of the subject systems and methods is intended to comprise, without being limited to, these and any other suitable types of memory. Processor 1006 is connected to a symbol modulator 1712 and transmitter 1714 that transmits the modulated signal.

Figure 18:
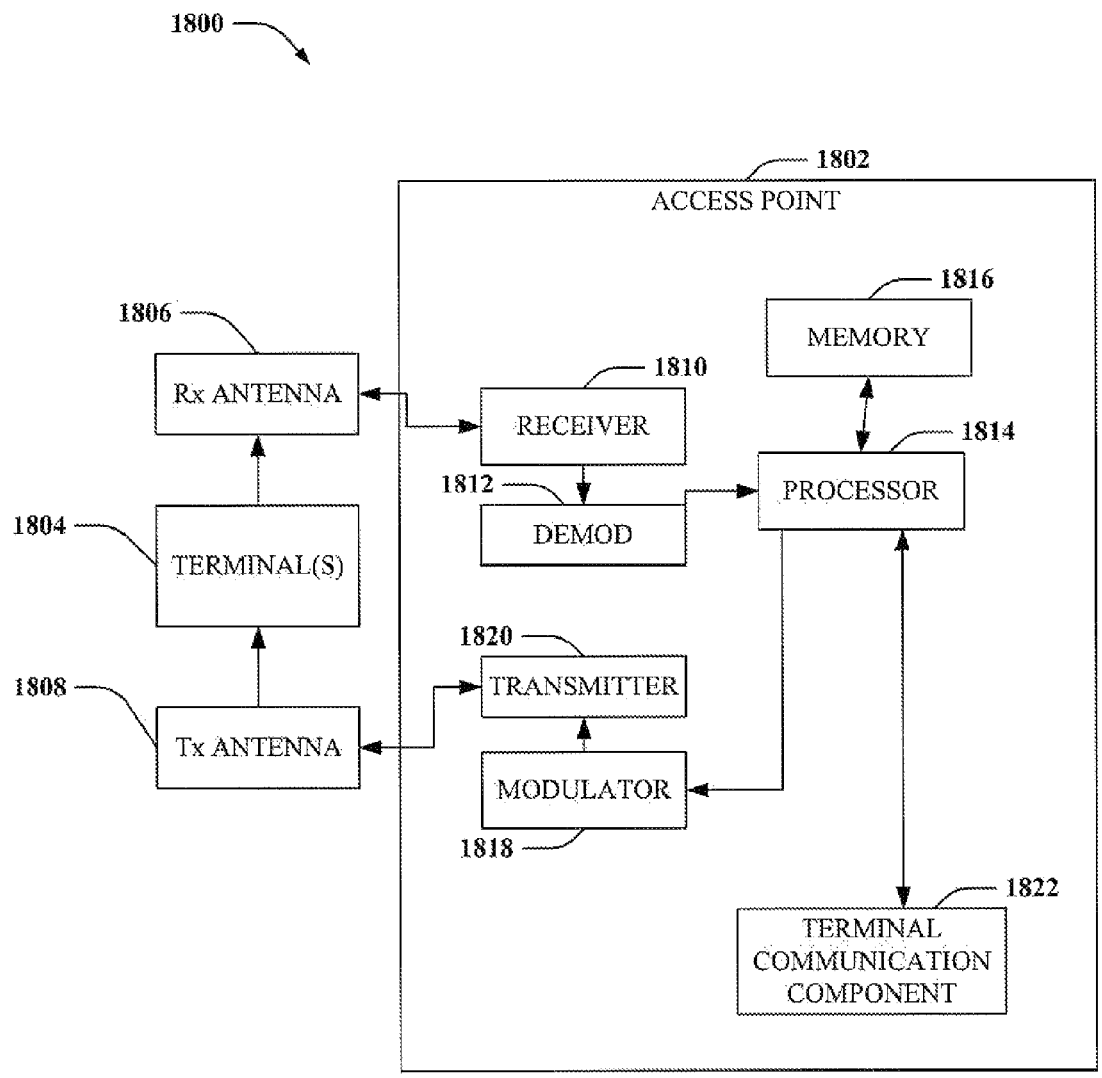
FIG. 18 illustrates a system that provides for processing reverse link communications at a non-serving sector of a terminal in accordance with one or more aspects presented herein.

FIG. 18 is an illustration of a system 1800 that facilitates other sector communication in a communication environment in accordance with various aspects. System 1800 comprises an access point 1802 with a receiver 1810 that receives signal(s) from one or more terminals 1804 through one or more receive antennas 1806, and transmits to the one or more terminals 1804 through a plurality of transmit antennas 1808. Terminals 1804 can include those terminals supported by the access point 1802, as well as terminals 1804 supported by neighboring sectors. In one or more aspects, receive antennas 1806 and transmit antennas 1108 can be implemented using a single set of antennas. Receiver 1810 can received information from receive antennas 1806 and is operatively associated with a demodulator 1812 that demodulates received information. Receiver 1810 can be, for example, an MMSE-based receiver, or some to her suitable receiver for separating out terminals assigned thereto, as will be appreciated by one skilled in the art. According to various aspects, multiple receivers can be employed (e.g. one per receive antenna), and such receivers can communicate with each other to provide improved estimates of user data. Demodulated symbols are analyzed by a processor 1814 that is similar to the processor described above with regard to FIG. 17, and is coupled to a memory 1816 that stores information related to terminals, assigned resources associated with terminals and the like. Receiver output for each antenna can be jointly processed by receiver 1810 and/or processor 1814. A modulator 1818 can multiplex the signal for transmission by a transmitter 1820 through transmit antennas 1808 to terminals 1804.

Access point 1802 further comprises a terminal communication component 1822, which can be a processor distinct from, or integral to, processor 1814. Terminal communication component 1822 can obtain resource assignment information for terminals supported by neighboring sectors. In addition, terminal communication component 1822 can provide assignment information to neighboring sectors for terminals supported by access point 1802. Assignment information can be provided via backhand signaling.

Based upon information regarding assigned resources, terminal communication component 1822 can direct detection of transmissions from terminals supported by neighboring sectors, as well as decoding of received transmissions. Memory 1816 can maintain packets received from terminals prior to receipt of the assignment information necessary for decoding of packets. Terminal communication component 1822 can also control transmission and receipt of acknowledgments indicating successful reception and decoding of transmissions. It is to be appreciated that terminal communication component 1822 can include transmission analysis code that performs utility based control in connection with assigning resources, identifying terminals for soft handoff, decoding transmissions and the like. The terminal analysis code can utilize artificial intelligence based methods in connection with performing inference and/or probabilistic determinations and/or statistical-based determinations in connection with optimizing terminal performance.

Figure 19:
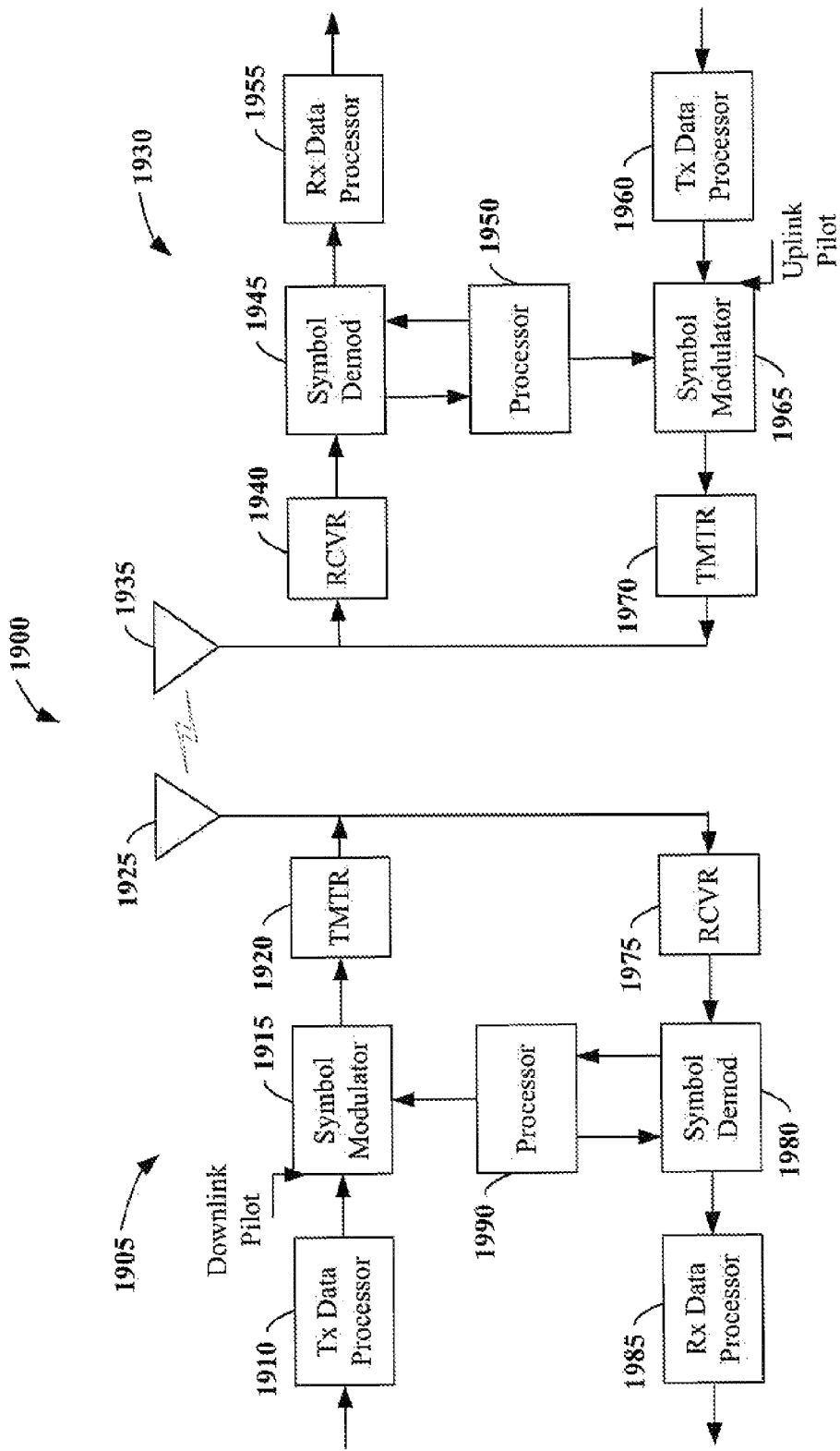
FIG. 19 illustrates a wireless communication environment that can be employed in conjunction with the various systems and methods described herein.

FIG. 19 illustrates an exemplary wireless communication system 1900. Wireless communication system 1900 depicts one base station and one terminal for sake of brevity. However, it is to be appreciated that system 1900 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 19, on a downlink at access point 1905, a transmit (TX) data processor 1910 receives, formats, codes, interleaves, and modulates (or symbol maps) traffic data and provides modulation symbols ("data symbols"). A symbol modulator 1915 receives and processes the data symbols and pilot symbols and provides a stream of symbols. A symbol modulator 1915 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM) or code division multiplexed (CDM).

A transmitter unit (TMTR) 1920 receives and converts the stream of symbols into one or more analog signals and further conditions (e.g., amplifies, filters, and frequency upconverts) the analog signals to generate a downlink signal suitable for transmission.

n over the wireless channel. The downlink signal is then transmitted through an antenna 1925 to the terminals. At terminal 1930, an antenna 1935 receives the downlink signal and provides a received signal to a receiver unit (RCVR) 1940. Receiver unit 1940 conditions (e.g., filters, amplifies, and frequency downconverts) the received signal and digitizes the conditioned signal to obtain samples. A symbol demodulator 1945 obtains N received symbols and provides received pilot symbols to a processor 1950 for channel estimation. Symbol demodulator 1945 further receives a frequency response estimate for the downlink from processor 1950, performs data demodulation on the received data symbols to obtain data symbol estimates (which are estimates of the transmitted data symbols), and provides the data symbol estimates to an RX data processor 1955, which demodulates (i.e., symbol demaps), deinterleaves, and decodes the data symbol estimates to recover the transmitted traffic data. The processing by symbol demodulator 1945 and RX data processor 1955 is complementary to the processing by symbol modulator 1915 and TX data processor 1910, respectively, at access point 1905.

On the uplink a TX data processor 1960 processes traffic data and provides data symbols. A symbol modulator 1965 receives and multiplexes the data symbols with pilot symbols, performs modulation, and provides a stream of symbols. A transmitter unit 1970 then receives and processes the stream of symbols to generate an uplink signal, which is transmitted by the antenna 1935 to the access point 1905.

At access point 1905, the uplink signal from terminal 1930 is received by the antenna 1925 and processed by a receiver unit 1975 to obtain samples. A symbol demodulator 1980 then processes the samples and provides received pilot symbols and data symbol estimates for the uplink. An RX data processor 1985 processes the data symbol estimates to recover the traffic data transmitted by terminal 1930. A processor 1990 performs channel estimation for each active terminal transmitting on the uplink.

Processors 1990 and 1950 direct (e.g., control, coordinate, manage, . . . ) operation at access point 1905 and terminal 1930, respectively. Respective processors 1990 and 1950 can be associated with memory units (not shown) that store program codes and data. Processors 1990 and 1950 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1990 and 1950.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Reference A is a presentation related to aspects described herein, and this reference forms part of this specification.

What is claimed is:

1. A method of selecting a demodulator, the method comprising:
    receiving a packet format that will be used for demodulation; and
    selecting either a Minimum Mean Square Error (MMSE) spatial equalizer, or a list sphere decoder (LSD) based on the received packet format, comprising:
        using the LSD when a code rate is greater than or equal to two-thirds;
        using the LSD when the code rate is between one-half and two-thirds and 16 quadrature amplitude modulation (QAM) or lower modulation order is employed;
        using the MMSE spatial equalizer when the code rate is between one-half and two-thirds and 64 QAM or higher modulation order is employed;
        using the LSD when the code rate is less than or equal to one-half and quadrature phase shift keying (QPSK) is employed; and
        using the MMSE spatial equalizer when the code rate is less than or equal to one-half and QPSK is not being employed,
    wherein the code rate represents a ratio of a number of bits entering an encoder to a number of bits exiting the encoder.

2. The method of claim 1, further comprising employing the LSD for a lower modulation order packet format, wherein the modulation order represents a number of bits transmitted by a modulation symbol.

3. A method of selecting a demodulator, the method comprising:
    receiving a packet format that will be used for demodulation; and
    selecting either a Minimum Mean Square Error (MMSE) spatial equalizer, or a list sphere decoder (LSD) based on the received packet format, comprising:
        using the LSD when a code rate is greater than or equal to two-thirds;
        using the LSD when the code rate is between one-half and two-thirds and 16 quadrature amplitude modulation (QAM) or lower modulation order is employed;
        using the MMSE spatial equalizer when the code rate is between one-half and two-thirds and 64 QAM or higher modulation order is employed;
        using the LSD when the code rate is less than or equal to one-half and quadrature phase shift keying (QPSK) is employed; and
        using the MMSE spatial equalizer when the code rate is less than or equal to one-half and QPSK is not being employed.

4. A method of selecting a demodulator operating in a Multiple-In-Multiple-Out (MIMO) receiver system, the method comprising:
    receiving a packet format that will be used for demodulation;
    selecting either a Minimum Mean Square Error (MMSE) spatial equalizer, or a list sphere decoder (LSD) based on the received packet format, comprising:
        using the LSD when a code rate is greater than or equal to two-thirds;
        using the LSD when the code rate is between one-half and two-thirds and 16 quadrature amplitude modulation (QAM) or lower modulation order is employed;

using the MMSE spatial equalizer when the code rate is between one-half and two-thirds and 64 QAM or higher modulation order is employed;
using the LSD when the code rate is less than or equal to one-half and quadrature phase shift keying (QPSK) is employed; and
using the MMSE spatial equalizer when the code rate is less than or equal to one-half and QPSK is not being employed; and
adjusting a number of candidate points to be decoded by the LSD by reducing a number of transmit and receive antennas in the MIMO receiver system.

5. An apparatus, comprising:
a receiving component that receives a packet format used for demodulation;
an analysis component that determines an optimal one of a plurality of demodulation schemes based at least in part upon the packet format; and
a demodulation component that
    uses a list sphere decoder (LSD) when a code rate is greater than or equal to two-thirds;
    uses the LSD when the code rate is between one-half and two-thirds and 16 quadrature amplitude modulation (QAM) or lower modulation order is employed;
    uses a Minimum Mean Square Error (MMSE) spatial equalizer when the code rate is between one-half and two-thirds and 64 QAM or higher modulation order is employed;
    uses the LSD when the code rate is less than or equal to one-half and quadrature phase shift keying (QPSK) is employed; and
    uses the MMSE spatial equalizer when the code rate is less than or equal to one-half and QPSK is not being employed,
wherein the code rate represents a ratio of a number of bits entering an encoder to a number of bits exiting the encoder.

6. An apparatus, comprising:
a receiving component that receives a packet format used for demodulation;
an analysis component that determines an optimal one of a plurality of demodulation schemes based at least in part upon the packet format; and
a demodulation component that employs a Minimum Mean Square Error (MMSE) spatial equalizer as the optimal demodulation scheme based at least in part on a code rate, comprising
    using a list sphere decoder (LSD) when the code rate is greater than or equal to two-thirds;
    using the LSD when the code rate is between one-half and two-thirds and 16 quadrature amplitude modulation (QAM) or lower modulation order is employed;
    using the MMSE spatial equalizer when the code rate is between one-half and two-thirds and 64 QAM or higher modulation order is employed;
    using the LSD when the code rate is less than or equal to one-half and quadrature phase shift keying (QPSK) is employed; and
    using the MMSE spatial equalizer when the code rate is less than or equal to one-half and QPSK is not being employed.

7. A non-transitory computer readable medium having stored thereon computer executable instructions for performing the following acts:
receiving a packet format which will be used for demodulation; and
selecting either a Minimum Mean Square Error (MMSE) spatial equalizer, or a list sphere decoder (LSD) based on the received packet format, comprising:
    using the LSD when a code rate is greater than or equal to two-thirds;
    using the LSD when the code rate is between one-half and two-thirds and 16 quadrature amplitude modulation (QAM) or lower modulation order is employed;
    using the MMSE spatial equalizer when the code rate is between one-half and two-thirds and 64 QAM or higher modulation order is employed;
    using the LSD when the code rate is less than or equal to one-half and quadrature phase shift keying (QPSK) is employed; and
    using the MMSE spatial equalizer when the code rate is less than or equal to one-half and QPSK is not being employed,
wherein the code rate represents a ratio of a number of bits entering an encoder to a number of bits exiting the encoder.

8. An apparatus, comprising:
means for receiving a data packet at a mobile device; and
means for selecting a demodulator based at least in part upon a packet format of the received data packet, comprising:
    means for using a list sphere decoder (LSD) when a code rate is greater than or equal to two-thirds;
    means for using the LSD when the code rate is between one-half and two-thirds and 16 quadrature amplitude modulation (QAM) or lower modulation order is employed;
    means for using a Minimum Mean Square Error (MMSE) spatial equalizer when the code rate is between one-half and two-thirds and 64 QAM or higher modulation order is employed;
    means for using the LSD when the code rate is less than or equal to one-half and quadrature phase shift keying (QPSK) is employed; and
    means for using the MMSE spatial equalizer when the code rate is less than or equal to one-half and QPSK is not being employed,
wherein the code rate represents a ratio of a number of bits entering an encoder to a number of bits exiting the encoder.

9. A non-transitory computer readable medium having stored thereon computer executable instructions for performing the following acts:
receiving a packet format which will be used for demodulation; and
selecting either a Minimum Mean Square Error (MMSE) spatial equalizer, or a list sphere decoder (LSD) based on the received packet format, comprising:
    using the LSD when a code rate is greater than or equal to two-thirds;
    using the LSD when the code rate is between one-half and two-thirds and 16 quadrature amplitude modulation (QAM) or lower modulation order is employed;
    using the MMSE spatial equalizer when the code rate is between one-half and two-thirds and 64 QAM or higher modulation order is employed;
    using the LSD when the code rate is less than or equal to one-half and quadrature phase shift keying (QPSK) is employed; and
    using the MMSE spatial equalizer when the code rate is less than or equal to one-half and QPSK is not being employed.

10. An apparatus, comprising:
means for receiving a data packet at a mobile device; and
means for selecting a demodulator based at least in part upon a packet format of the received data packet, comprising:
  means for using a list sphere decoder (LSD) when a code rate is greater than or equal to two-thirds;
  means for using the LSD when the code rate is between one-half and two-thirds and 16 quadrature amplitude modulation (QAM) or lower modulation order is employed;
  means for using a Minimum Mean Square Error (MMSE) spatial equalizer when the code rate is between one-half and two-thirds and 64 QAM or higher modulation order is employed;
  means for using the LSD when the code rate is less than or equal to one-half and quadrature phase shift keying (QPSK) is employed; and
  means for using the MMSE spatial equalizer when the code rate is less than or equal to one-half and QPSK is not being employed.

\* \* \* \* \*